United States Patent [19]

Grandy

[11] Patent Number: 4,902,092
[45] Date of Patent: Feb. 20, 1990

[54] MULTI-PIECE CONNECTOR AND RECEPTACLE THEREFOR

[75] Inventor: Mark E. Grandy, Port Huron, Mich.

[73] Assignee: Prestolite Wire Corporation, Farmington Hills, Mich.

[21] Appl. No.: 140,721

[22] Filed: Jan. 4, 1988

[51] Int. Cl.⁴ .......................... G02B 6/36; G02B 7/26
[52] U.S. Cl. .................................. 350/96.20; 439/502
[58] Field of Search ............... 350/96.20, 96.21, 96.22; 339/29 R, 32 R, 33, 47 R-49 B

[56] References Cited

U.S. PATENT DOCUMENTS 4,741,590 5/1988 Caron .............................. 350/96.21

Primary Examiner—William L. Sikes
Assistant Examiner—Robert E. Wise
Attorney, Agent, or Firm—James R. Ignatowski; Remy J. VanOphem

[57] ABSTRACT

A connector and receptacle therefor used preferably to link a number of remote devices in daisy chain fashion by the joining of a plurality of separate cable segments. The cable segments may contain electrical conductors, optical conductor fibers, or a hybrid thereof. Each cable segment ends with a connector. Each cable segment is serially linked to the next through a joining of pairs of connectors to form a unified connector. By the formation of the unified connectors, the plurality of cable segments are serially joined into what is effectively a single piece harness. Each remote device is connected to a unified connector through a receptacle which receives the unified connector. In order to secure a daisy chaining effect between remote devices, a shunt for electrically connecting similarly functioning conductors in the connectors of each unified connector may be provided in the receptacle.

30 Claims, 3 Drawing Sheets

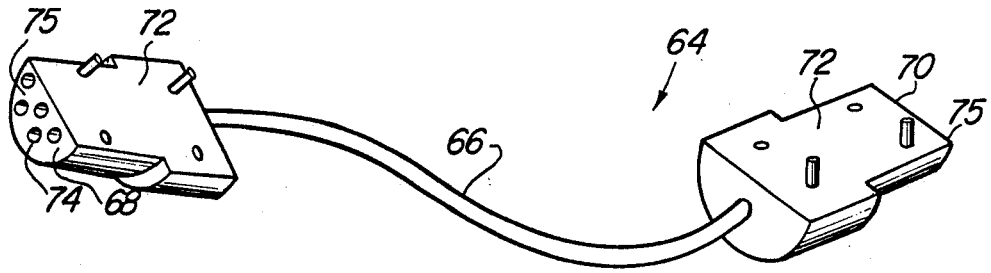
_Fig-4_
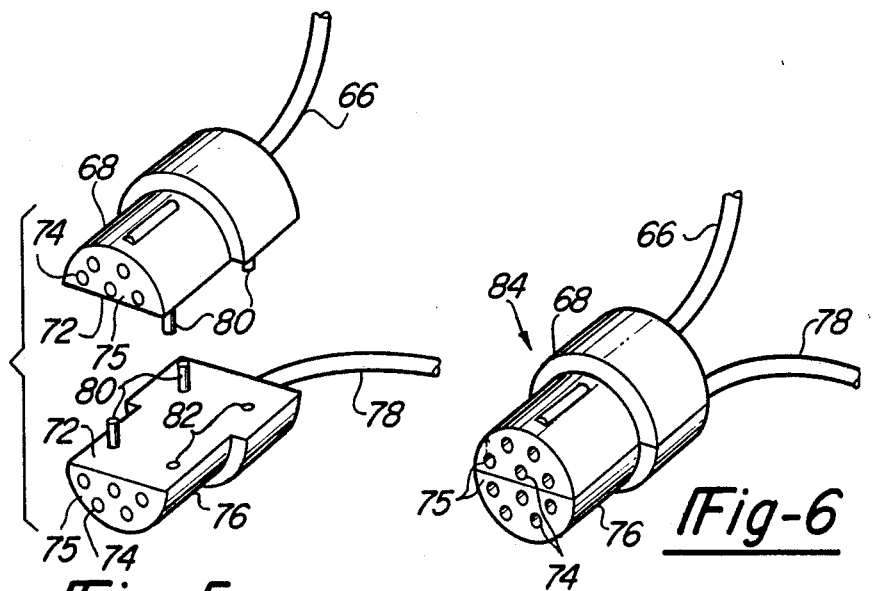
_Fig-5_   _Fig-6_
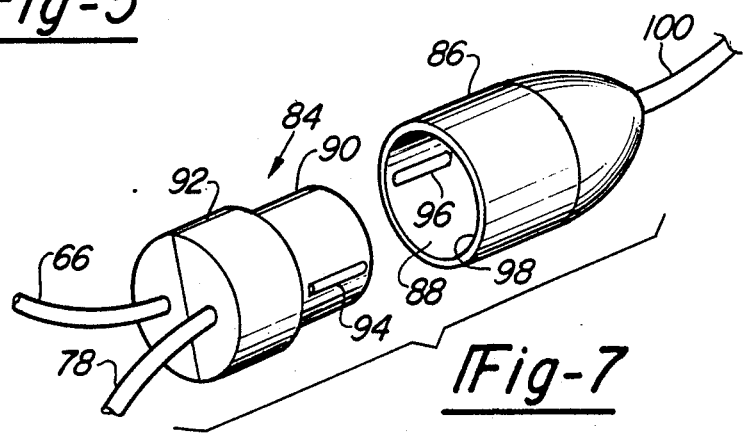
_Fig-7_

MULTI-PIECE CONNECTOR AND RECEPTACLE THEREFOR

BACKGROUND OF THE INVENTION

1. Field of the Invention

This invention relates to connector cable systems, and more particularly to a unified connector and receptacle therefor, where the unified connector is formed by a joining together of two connectors, each from a separate cable.

2. Description of the Prior Art

Harnesses made of electrical conductors, optical fibers or a hybrid thereof, are used in order to connect a source device to one or more remote devices. This may be for purposes of data transmission or power transmission or a combination thereof. An example of a simple harness is the case of a cable connecting a source of power, such as a battery, to a switch and then to an actuator, such as a power window motor in an automobile. In such a simple circuit it is very easy to design a harness using a cable having the appropriate connectors. This matter becomes seriously complicated, however, in situations involving a number of end devices, where each end device must be serially linked under independent control to a source device. Frequently, this is accomplished through use of a multiplexing system. An example of such a circuit topology is shown schematically in FIG. 1, where an automobile 10 has a number of end devices in the form of a power window actuator 12 and an electric door lock actuator 14 located in each of its four doors 16. It will be seen from the figure that a harness 17 is in the form of a closed loop composed of four cable segments 18 which are serially linked by connections to multiplexing modules 19. The harness 17 is composed of a plurality of cable segments 18 because it is extremely difficult to install it as a single piece unit in the automobile.

Because of connector multiplicity, complexity, and cost, harness installations that incorporate a number of individual cable segments are not desirable. However, as explained above, frequently it is not practicable to install a single piece harness in a particular installation. Accordingly, what is needed is a simple and inexpensive connector that will link these cable segments into what is effectively a single piece harness.

In the prior art, various connector systems are known. U.S. Pat. No. 4,596,436 to Kraemer et al, discloses an electrical connector housing having located therein connector modules 28, 30, and 32. Each of the connector modules remain separated in space, and each is intended to be mated separately with a respective connector from outside the housing. U.S. Pat. No. 4,073,564 to Davis, Jr., discloses a christmas tree lighting string which has a two part plug that can be separated to allow the string to be stretched out linearly. This plug configuration allows easy and untangled storage of the string, as well as a convenient means to untangle the string during use. This device is structured to operate with only a single lighting string.

In my co-pending U.S. patent application Ser. No. 946,308, now U.S. Pat. No. 4,767,168 filed Dec. 24, 1986, entitled "A Hybrid Connector Cable System," hereby incorporated by reference, a hybrid optical and electrical connector is described.

As can be seen from FIG. 2, a hybrid cable 22 is provided having two end connectors 24 and 26. The hybrid cable 22 embodies at least one optical conductor fiber 28 and at least one electrical conductor 32. The hybrid cable 22 may also have a second optical conductor fiber 30 and a second electrical conductor 34 which may function as a ground wire or the conductor for a regulated voltage, as desired.

The connectors 24 and 26 are preferably made from a structural plastic material injection molded onto the ends of the hybrid cable 22. The input connector 24 has a plurality of connector pins 36 provided at the end thereof. The connector pins 36 may be disposed along two or more lines, or may be disposed in a circle or any pattern as desired for a given application. The two electrical leads of a photodetector 38 for converting a light signal to an electrical signal, such as a photodiode or phototransistor, are electrically connected to a first pair of connector pins 36, while the two electrical leads of a light source 40 for converting an electrical signal to a light signal, such as a light emitting or laser diode or any other device for generating a light signal, are electrically connected to a second pair of connector pins 36. Each of the electrical conductors 32 and 34 are connected directly to a separate connector pin 36.

The leads from the photodetector 38 and the light source 40 as well as the two electrical conductors 32 and 34 are electrically connected to the connector pins 36 using any of the conventional methods known in the art. They may be crimped, soldered, or welded to make a mechanically strong electrical connection.

The photodetector 38 and the light source 40 are mounted on a component board 42 to prevent their displacement during the injection molding of the connector 24. The component board 42 also has provisions for retaining wire clamps 44 for positioning the electrical or metal conductors 32 and 34 relative to their respective connector pins 36, and fiber clamps 46 for positioning the optical conductor fibers 28 and 30 relative to the photodetector 38 and the light source 40, respectively.

The structure of the output connector 26 attached to the other end of the hybrid cable 22 is identical to the structure of the input connector 24 discussed above, except at this end of the hybrid cable 22, a photodetector 48 is optically connected to the optical conductor fiber 30 and a light source 50 is optically connected to the optical conductor fiber 28. In this manner, each optical conductor fiber has a light source disposed at one end and a photodetector disposed at the other end.

The structure of the photodetector 38 is shown in FIG. 3. The photodetector 38 has a solid state photodetector element 52, such as a photodiode or phototransistor, the electrical leads of which are connected to a pair of pins 54 and 56 protruding from an insulator base 58. The photodetector element 52 is encapsulated in a plastic housing 60 which is transparent to the received light signal. The housing 60 also supports the photodetector element 52 relative to the insulator base 58. An aperture 62 is provided in the plastic housing 60 directly in line with the sensitive area of the photodetector element 52. The aperture 62 receives and positions the end of the optical conductor fiber 28 adjacent to the photosensitive area of the photodetector element 52. The optical conductor fiber 28 may be glued or cemented to the aperture 62 to hold it in place during the extrusion molding of the input connector 24.

Preferably, a thin layer of the transparent plastic used in fabrication of the plastic housing 60 is left at the bottom of the aperture 62 to cover the photosensitive area of the photodetector element 52 to protect it from abrasion by the end of the optical conductor fiber 28.

The structure of the light source, such as the light emitting or laser diodes 40 or 50, is similar to the structure of the photodetector 38 shown in FIG. 3 except that the photodetector element 52 is replaced by a light emitting element. The light source 40 generates a light signal which is transmitted by the optical conductor fiber 30 to the output connector 26 which is received by the photodetector 48. In a like manner, the light source 50 generates a light signal which is transmitted by the optical conductor fiber 28 to the input connector 24 where it is received by the photodetector 38. The structure of the photodetector 48 in the output connector 26 is the same as the photodetector 38 illustrated in FIG. 3.

It, therefore, remains a problem in the prior art to devise a simple, effective, and reliable connector which can combine separate cables, having either electrical conductors, optical conductor fibers, or a hybrid thereof, into what is effectively a single piece harness.

SUMMARY OF THE INVENTION

The invention is a unified connector formed by joining a plurality of connectors, each of which is connected to a separate cable segment. The unified connector is receivable by a receptacle. A first cable segment having at least one conductor is provided. A first connector is connected to one end of the first cable segment and the first connector has provision for connecting one end of the at least one conductor in the first cable segment to a terminal in the first connector. A second cable segment having at least one conductor is also provided. A second connector is connected to one end of the second cable segment and the second connector has provision for connecting one end of the at least one conductor of the second cable to a terminal in the second connector. The first and second connectors are substantially similar in shape and are joined to form the unified connector. Provision is also made for holding the first and second connectors in joined relation to each other.

Accordingly, it is an object of the invention to provide for the joining of separate cable segments into a single piece harness, where the cables carry electrical wires, optical conductor fibers, or a hybrid thereof.

It is a further object of the invention to provide for the joining of separate cable segments into a single piece daisy chain type harness.

It is still a further object of the invention to provide, at the ends of the cables to be joined, half-connectors which are mutually symmetrical and which may be laterally joined in order to form a single unified connector.

It is yet a further object of the invention to provide a receptacle for receiving the unified connector formed by the mating of two half connectors and selectively shunting similarly functioning conductors within the half-connectors, allowing for daisy chaining of assembled cable segments.

These and other objects, advantages, features, and benefits of the invention will become apparent from the following specification.

BRIEF DESCRIPTION OF THE DRAWINGS

FIG. 4 is a perspective view of a cable having half connectors at each end according to the invention;

FIG. 5 is a perspective view showing mating orientation of half-connectors according to the invention;

FIG. 6 is a perspective view showing two half connectors mated to form a unified connector according to the invention;

FIG. 7 is a perspective view showing the unified connector according to the invention oriented for mating with a receptacle;

DETAILED DESCRIPTION OF THE PREFERRED EMBODIMENT

Figure 1:
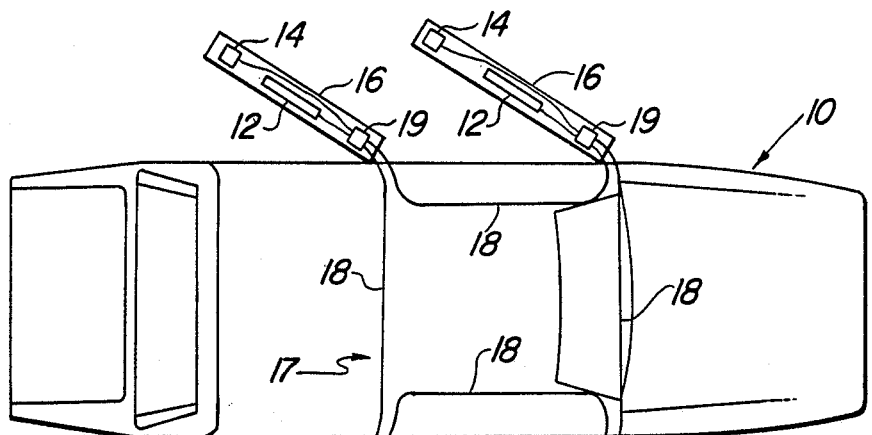
FIG. 1 is a schematic drawing of a prior art automotive harness.

Referring now to the figures, FIG. 4 shows a cable segment 64 according to the invention. A cable 66 may contain a plurality of electrical conductors, optical conductor fibers, or a hybrid thereof. The cable is preferably to be used as a segment of a harness being assembled from a series of such cable segments. Each end of the cable 66 has a connector 68 and 70. The connectors may be in the shape of a cylinder or a polygon which is cut in half to form a flat surface 72. Each of the connectors 68 and 70 have a plurality of apertures 74 on a facing end 75 for receiving terminals from a receptacle, as will be explained later.

FIG. 5 shows two connectors, one 68 from the cable 66 in FIG. 4 and another 76 from another separate cable 78. Each of the connectors 68 and 76 are mated by laterally joining each of the respective flat surfaces 72. A fastening mechanism is provided to align and hold the two connectors together when they have been mated. In the preferred embodiment, this is shown as pins 80 which insert into aligning apertures 82; however, any suitable fastening mechanism known in the art may be used. FIG. 6 shows the two connectors 68 and 76 joined to form a unified connector 84. It will be seen from FIG. 6 that the two joined connectors now from a completed cylindrical shape.

FIG. 7 shows the unified connector 84 in position for being received by a receptacle 86. The cross-section of an opening 88 in the receptacle 86 is dimensioned for receiving the unified connector 84. Particularly, the unified connector 84 has a forward end 90 of smaller cross-section than a rearward end 92. This allows the forward end 90 to insert into the receptacle opening 88 and the rearward end 92 will then the same outside cross-sectional diameter as the receptacle 86. A boss 94 is provided on each of the connectors 68 and 76 which aligns with slots 96 on the interior surface 98 of the receptacle opening 88. The co-action of the bosses with the slots ensures proper terminal-to-terminal alignment will take place when the unified connector is seated within the receptacle. It is, of course, also possible to put the bosses on the surface 98 of the receptacle 86 and to put a slot on each of the connectors 68 and 76. In situations where there is a need to distinguish alignment of the unified connector even more particularly, it is possible to have only one connector having a slot or boss, in which case the receptacle would also have, respectively, only one boss or slot. It is also possible to use color coding, or other methods known in the art, so that each of the connectors can be shaped in every respect symmetrically while still ensuring only a single insertion orientation of alignment with the receptacle.

It is to be understood from FIG. 7 that the unified connector 84 has been formed by the joining of separate cables 66 and 78 at the connectors 68 and 76.

The receptacle 86 has a cable 100 connected thereto for connection to some remote device (not shown). Accordingly, as an example of operation, power can be sent from a source (not shown) through the cable 66 to a first remote device (not shown) by the cable 100 and also to another remote device (not shown) by the cable 78. In this manner, a harness is assembled and remote devices are connected in daisy chain fashion.

Figure 8:
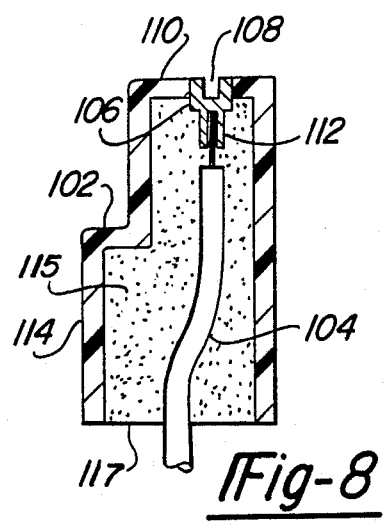
FIG. 8 is a cross-sectional view of a half-connector according to the invention having an electrical conductor cable attached thereto.

FIG. 8 shows a connector 102 in cross-section. A single electrical conductor cable 104 is shown for simplicity, but it is understood that a connector using a plurality of electrical conductors would be structured using the same principles. As can be seen from the figure, a female electrical terminal 106 is provided immediately beneath an aperture 108 in the facing end 110 of the connector 102. The cable 104 is attached to the female electrical terminal 106 at its base 112 in a known manner, such as soldering. The connector 102 is formed of an outer shell made of a rigid or semi-rigid material, such as structural plastic, forming an inner cavity 115. A potting compound 117 is provided inside the cavity 115 of the connector for mechanically securing the cable 104 as well as sealing it from the environment. Alternatively, a mechanical restraint could be used to hold the cable 104, as will be described later.

Figure 9:
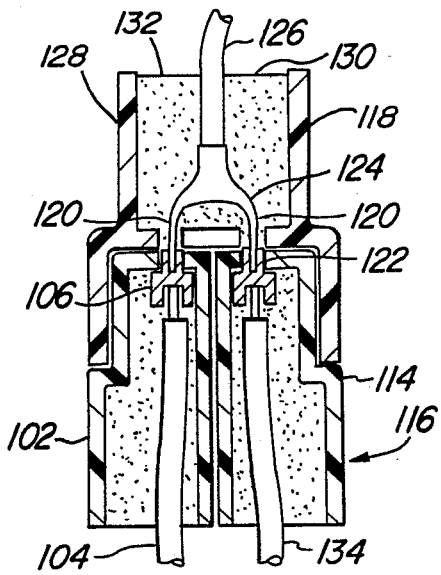
FIG. 9 is a cross-sectional view of a unified connector inserted into a receptacle according to the invention.

FIG. 9 shows two identical connectors 102 and 114 forming a unified connector 116 that is received by a receptacle 118. As can be seen from the figure, each of two male electrical terminals 120 on the receptacle 118 are received by the female electrical terminals 106 and 122 of the unified connector 116. As can be further seen from the figure, the male electrical terminals 120 are connected together, forming an electrical shunt 124. The electrical shunt may be in the form of a "Y", as shown, in which the base of the "Y" forms an electrical terminal which is connected to a cable 126 which may, in turn, be connected to a remote device (not shown). While a "Y" type electrical shunt is shown, any suitable electrical shunt known in the art can be used. The receptacle 118, like the connectors 102 and 114, is formed of an outer shell 128 made of a rigid or semi-rigid material, such as a structure plastic, forming an inner cavity 130. A potting material 132 is used for mechanically securing the cable 126 as well as sealing it from the environment. It is also possible to use a mechanical restraint to hold the cable 126, as will be described later.

With the configuration shown in FIG. 9, a harness may be formed by the mating of the two connectors 102 and 114 into the unified connector 116. The invention is used preferably to link a number of remote devices (not shown) in a daisy chain fashion through the joining of the cable segments. Each remote device is connected through a respective unified connector to the receptacle 118 which receives the unified connector 116. In order to secure the daisy chaining effect between remote devices, the shunt is provided to shunt similarly functioning conductors 104 and 134 of the unified connector 116. As an example, electrical power from a source (not shown) is routed through the cable 104, into the shunt 124, then into a first remote device (not shown) by the cable 126 and into a second remote device (not shown) by the cable 134.

Figure 10:
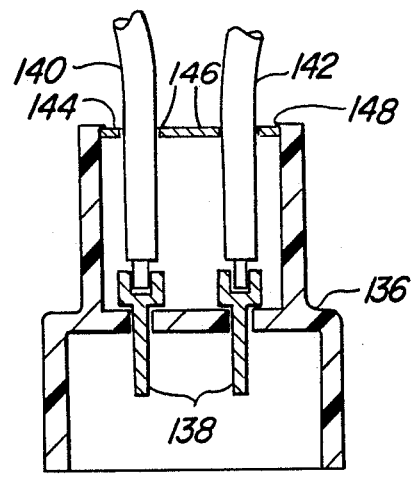
FIG. 10 is a cross-sectional view of a receptacle for receiving a unified connector according to the invention.

FIG. 10 shows an alternative structure for the receptacle, in which the shunt is absent. In this configuration a receptacle 136 has two terminals 138, each separately connected to cables 140 and 142.

In the event the connections within the connectors or the receptacle may be changed or modified during their respective lifetime, it is preferred that potting compound not be used. Instead it is preferred to use a mechanical restraint to support and seal the cables within the connectors or the receptacle. An example of such a restraint is shown in FIG. 10 for a connector and a receptacle, respectively. A rigid material, such as structural plastic, forms a plate 144 with apertures 146 for admitting passage of the cables 140 and 142. The plate 144 is fitted with an annular snap 148 located on the receptacle or the connector, respectively.

Figure 3:
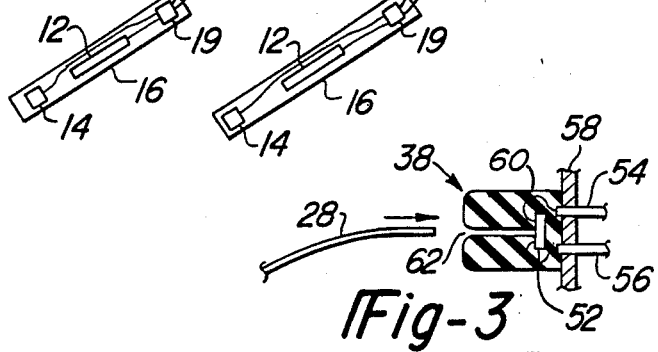
FIG. 3 is a cross-sectional view of a prior art photodetector.
Figure 2:
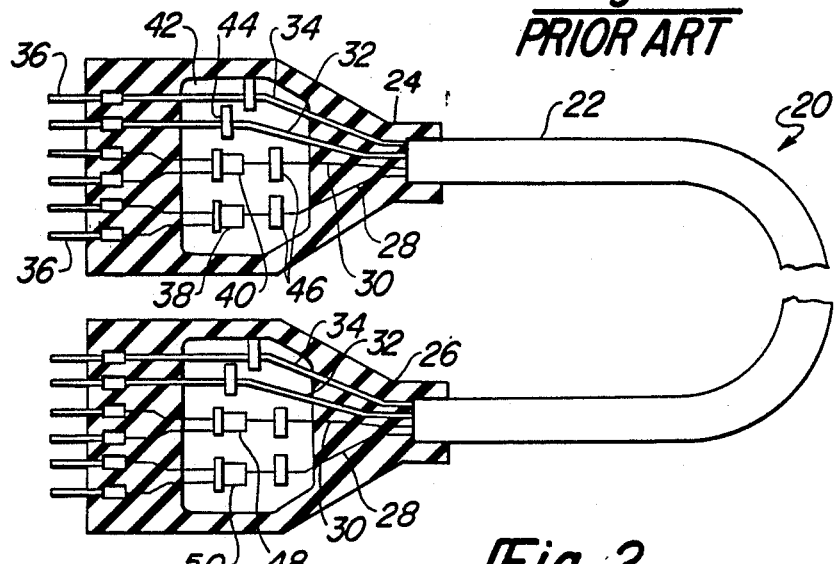
FIG. 2 is a partial cross-section of a prior art connector cable showing details of the hybrid connector cable system in an automobile application.
Figure 11:
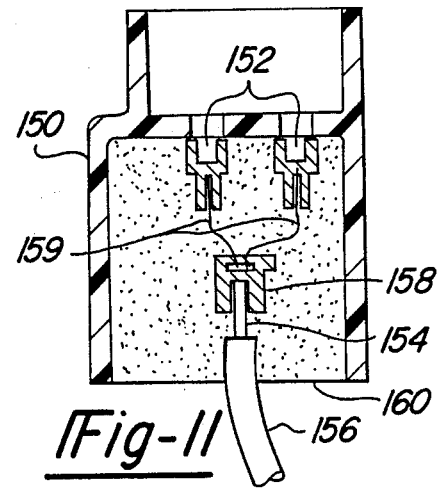
FIG. 11 is a cross-sectional view of a half-connector according to the invention having an optical conductor fiber cable attached thereto.

FIG. 11 shows an alternative embodiment of the invention in which only optical conductor fiber cable is used. A connector 150 has two female electrical terminals 152. In the manner of the structure and operation described above with reference to the electro-optic device or photodetector 38 in FIG. 3, an optical conductor fiber 154, having a protector sheath 156, is connected to either a light emitting laser diode or a photodetector 158. Two electrical leads 159 are connected thereto. The electrical leads 159 are connected to the base of the female electrical terminals by any known manner, such as soldering. Potting material 160 is used to hold the electro-optic components in a fixed position within the connector. The connector 150 may then be combined with another identical connector to form a unified connector in the manner described above. The resulting unified connector can then be received by a receptacle, either of the kind described above in FIG. 9 and 10, or one having an electro-optic device of the kind just described.

Figure 12:
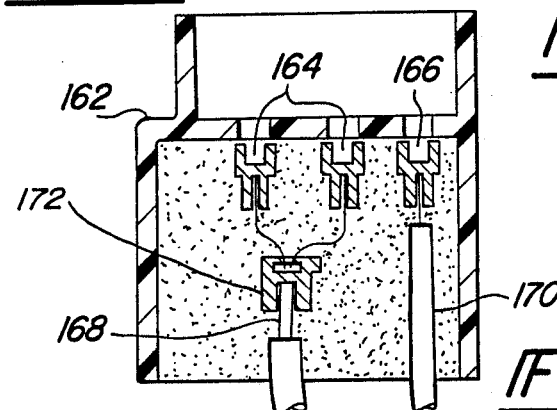
FIG. 12 is a cross-sectional view of a half-connector according to the invention having hybrid cables attached thereto.

FIG. 12 shows another alternative embodiment of the invention in which a hybrid of electrical conductor cables and optical conductor fiber cables is used. Here a connector 162 has three female electrical terminals 164 and 166. As can be seen from the figure, two of the female electrical terminals 164 are connected to an electro-optical device 172 which is connected to an optical conductor fiber cable 168 in the manner described hereinabove in the discussion of FIG. 11. The female electrical terminal 166 is connected to an electrical conductor cable 170 in the manner described in the discussion of FIGS. 4 through 9. The connector 162 is then combined with an identical half connector to form a unified connector. The resulting unified connector may then be received into a receptacle either of the kind described hereinabove in the discussion of FIGS. 9 through 11 or into one having electrical conductor cables and optical conductor fiber cables of the hybrid kind just described. The structural and functional interrelationship between the optical conductors and the electrical conductors is further elaborated in my aforementioned patent application, which describes a control circuit used for connecting these to a remote device. While the preferred shape of the connectors is mutually symmetrical, the preferred terminal arrangement is mutually in mirror image. Further, while the foregoing description of the preferred embodiment of the invention describes two connectors being joined to form the unified connector, it is straight forward from the foregoing description to modify the connectors so that more than two must be joined to form the unified connector. For instance, three connectors each being of a triangular wedge-shape and having a part cylindrical surface can be joined to form a cylindrically-shaped unified connector.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. In a cable connection system having a unified connector receivable in a receptacle, said unified connector comprising:
   a first cable segment having at least one conductor;
   a first connector member connected to one end of said first cable segment, said first connector member having one end of said at least one conductor in said first cable segment connected to an electrical terminal in said first connector member;
   a second cable segment having at least one conductor;
   a second connector member connected to one end of said second cable segment, said second connector member having one end of said at least one conductor of said second cable connected to an electrical terminals in said second connector member, said first and second connector members being laterally joinable to each other to form said unified connector receivable in said receptable; and
   means for retaining said first connector member in said laterally joined relationship with said second connector member prior to being received in said receptacle.

2. The unified connector of claim 1, wherein said at least one conductor in said first and second cable segments is at least one electrical conductor.

3. The unified connector of claim 1, wherein said at least one conductor of said first cable segment is at least one optical conductor fiber conducting an optical signal and wherein said first connector member has electro-optic converter means connected between said at least one optical conductor fiber and said electrical terminal for converting between said optical signal conducted by said at least one optical conductor fiber and an electrical signal.

4. The unified connector of claim 3, wherein said at least one conductor of said second cable segment is at least one optical conductor fiber conducting an optical signal, and wherein said second connector member has converter means connected between one end of said at least one optical conductor fiber and said electrical terminal for converting between electrical signals and optical signals conducted by said at least one optical conductor fiber.

5. The unified connector of claim 1, wherein said at least one conductor of said first cable segment is at least one electrical conductor and at least one optical conductor fiber, and said first connector member has electro-optic converter means associated with each of said at least one optical conductor fiber, said electro-optic converter means connected between said at least one optical conductor fiber and an electrical terminal to convert between an optical signal conducted by said at least one optical conductor fiber and an electrical signal.

6. The unified connector of claim 5, wherein said at least one conductor of said second cable segment is at least one electrical conductor connected to a first electrical terminal in said second connector member and at least one optical conductor fiber, and wherein said second connector member has converter means connected between said at least one optical conductor fiber and a second electrical terminal in said second connector member for converting between optical signals conducted by said at least one optical conductor fiber and electrical signals conducted by said second electrical terminal.

7. A cable connection system having a unified connector and a receptacle for receiving said unified connector, said unified connector comprising:
   a first cable segment having at least one electrical conductor;
   a first connector member connected to one end of said first cable segment, said first connector member having one end of said at least one electrical conductor of said first cable segment connected to an electrical terminal in said first connector member;
   a second cable segment having at least one electrical conductor;
   a second connector member connected to one end of said second cable segment, said second connector member having one end of said at least one electrical conductor of said second cable segment connected to an electrical terminal means in said second connector member, said first and second connector members being joinable in a side-by-side relationship to form said unified connector; and
   means for retaining said first connector member in said side-by-side joined relation with said second connector member prior to being received in said receptacle.

8. The cable connection system of claim 7, further comprising a third cable segment having at least one electrical conductor connected to an electrical terminal in said receptacle, said electrical terminal in said first connector member and said electrical terminal in at least one of said first and said second connector members being in electrical contact with said electrical terminal in said receptacle when said unified connector is received in said receptacle.

9. The cable connection system of claim 8, wherein said receptacle has therein an electrical shunt for connecting said electrical terminal in said first connector member with said electrical terminal in said second connector member.

10. The cable connection system of claim 9, wherein said means for retaining is releaseable.

11. The cable connection system of claim 10, wherein said first and second connector members are mutually symmetrically shaped.

12. The cable connection system of claim 11, wherein a third connector member is connected to the other end of said first cable segment, said third connector member having the other end of said at least one electrical conductor of said first cable segment connected to an electrical terminal of said third connector member, and further wherein a fourth connector member is connected to the other end of said second cable segment, said fourth connector member having the other end of said at least one electrical conductor of said second cable segment connected to an electrical terminal in said fourth connector member.

13. The cable connection system of claim 7, wherein said first cable segment has at least one optical conductor fiber for conducting a first optical signal;
said first connector member has electro-optic converter means connected between one end of said at least one optical conductor fiber of said first cable segment and said electrical terminal in said first connector member for converting between said first optical signal conducted by said at least one optical conductor fiber and an electrical signal;
said second cable segment has at least one optical conductor fiber for conducting a second optical signal; and
said second connector member has electro-optic converter means connecting one end of said at least one optical conductor fiber of said second cable segment to said electrical terminal in said second connector member for converting between said second optical signal conducted by said at least one optical conductor fiber and an electrical signal.

14. The cable connection system of claim 13 further comprising a fourth cable segment having at least a first electrical conductor connected to a first electrical terminal in said receptacle and having at least a second electrical conductor connected to second electrical terminal in said receptacle, said electrical terminal in said first connector member being in electrical contact with one of said first and second electrical terminals, and said electrical terminal in said second connector member being in electrical contact with the other of said first and second electrical terminals when said unified connector is received in said receptacle.

15. The cable connection system of claim 13, further comprising:
a third cable segment having at least one electrical conductor connected to an electrical terminal in said receptacle, at least one of said electrical terminal in said first connector member and said electrical terminal in said second connector member being in electrical contact with said electrical terminal in said receptacle when said unified connector is received in said receptacle.

16. The cable connection system of claim 15, wherein said electrical shunt is also connected to one of said at least one electrical conductor of said third cable segment.

17. The cable connection system of claim 15, wherein said receptacle has an electrical shunt for connecting said electrical terminal in said first connector member with said electrical terminal in said second connector member.

18. The cable connection system of claim 17, wherein said means for retaining is releasable.

19. The cable connection system of claim 18, wherein said first and second connector members are mutually symmetrically shaped.

20. The cable connection system of claim 19, wherein a third connector member is connected to the other end of said first cable segment, said third connector member having the other end of said at least one electrical conductor of said first cable segment connected to an electrical terminal in said third connector member, said third connector member further having electro-optic converter means connecting one end of said at least one optical conductor fiber of said first cable segment to an electrical terminal in said third connector member, and further wherein a fourth connector member is connected to the other end of said second cable segment, said fourth connector member having the other end of said at least one electrical conductor of said second cable segment connected to an electrical terminal in said fourth connector member, said fourth connector member further having electro-optic converter means connecting one end of said at least one optical conductor fiber to an electrical terminal in said fourth connector member.

21. A cable connection system having a unified connector receivable in a receptacle, comprising:
a first cable segment having at least one optical fiber for transmitting a first optical signal;
a first connector half connected to one end of said first cable segment, said first connector half having electro-optic converter means connected between one end of said at least one optical fiber in said first cable segment and an electrical terminal in said first connector half;
a second cable segment having at least one optical fiber for transmitting a second optical signal;
a second connector half connected to one end of said second cable segment, said second connector half having electro-optic converter means connected between one end of said at least one optical fiber of said second cable segment and an electrical terminal in said second connector half, said first and second connector halves being laterally joined to each other to form said unified connector; and
means for retaining said first connector half in said joined relation with said second connector half prior to being received in said receptacle.

22. The cable connection system of claim 21, further comprising a third cable segment having at least one conductor connected to a first electrical terminal in said receptacle, said electrical terminal in said first connector half and said electrical terminal in said second conductor half being in electrical contact with said first electrical terminal in said receptacle when said unified connector is received in said receptacle.

23. The cable connection system of claim 22 wherein said third cable segment has at least a second conductor connected to a second electrical terminal in said receptacle, said electrical terminal in said first connector half making electrical contact with one of said at least first and said at least second electrical terminals in said receptacle, and said electrical terminal in said second connector half being in electrical contact with the other of said at least first and said at least second electrical terminals of said receptacle when said unified connector is received in said receptacle.

24. The cable connection system of claim 22, wherein said receptacle has therein an electrical shunt connecting said electrical terminal in said first connector half with said electrical terminal in said second connector half which are connected to said at least one optical fibers of said first and second cable segments.

25. The cable connection system of claim 23 wherein said shunt is further connected to said at least one conductor of said third cable segment.

26. The cable connection system of claim 24, wherein said means for retaining is releasable.

27. The cable connection system of claim 23, wherein said first and second connector halves are mutually symmetrically shaped.

28. The cable connection system of claim 27, wherein a third connector half is connected to the other end of said first cable segment, said third connector half having electro-optic converter means connected between the other end of said at least one optical fiber of said first cable segment and an electrical terminal in said third connector half for converting between said first optical signal and an electrical signal; and further wherein a fourth connector half is connected to the other end of said second cable segment, said fourth connector half having electro-optic converter means connected between the other end of said at least one optical conductor fiber of said second cable segment and an electrical terminal in said fourth connector half.

29. A cable connection system including a unified connector formed by joining a plurality of connectors each of which is connected to a separate cable segment and a receptacle for receiving said unified connector, comprising:
- a first cable segment having at least one electrical conductor;
- a first connector connected to one end of said first cable segment, said first connector having electrical connection means for connecting one end of said at least one electrical conductor of said first cable segment to an electrical terminal means in said first connector;
- a second cable segment having at least one electrical conductor;
- a second connector connected to one end of said second cable segment, said second connector having electrical connection means for connecting one end of said at least one electrical conductor of said second cable segment to an electrical terminal means in said second connector, said first and second connectors being laterally joined to form said unified connector;
- a third cable segment having at least one electrical conductor;
- a receptacle structured to receive said unified connector, said receptacle further having electrical connection means for connecting one end of said at least one electrical conductor of said third cable segment to electrical terminal means in said receptacle, said electrical terminal means in said first connector and said electrical terminal means in said second connector being in electrical contact with said electrical terminal means in said receptacle when said unified connector is received by said receptacle; and
- means for retaining said first connector in joined relation with said second connector.

30. The cable connection system of claim 29, wherein said receptacle has therein an electrical shunt for shunting similarly functioning said at least one electrical conductors of said first and second cable segments.

* * * * *

UNITED STATES PATENT AND TRADEMARK OFFICE
CERTIFICATE OF CORRECTION

PATENT NO. : 4,902,092
DATED : February 20, 1990
INVENTOR(S) : Mark E. Grandy

It is certified that error appears in the above-identified patent and that said Letters Patent is hereby corrected as shown below:

Column 1, line 54, delete "christmas" and insert ---- Christmas ----.

Column 4, line 56, delete "from" and insert ---- form ----.

Column 4, line 65, after "then" insert ---- have ----.

Column 7, line 37, delete "terminals" and insert ---- terminal ----.

Column 10, line 45, delete "con-".

Column 10, line 46, delete "ductor" and insert ---- connector ----.

Signed and Sealed this

Fourth Day of June, 1991

*Attest:*

HARRY F. MANBECK, JR.

*Attesting Officer*  *Commissioner of Patents and Trademarks*